(12) United States Patent
Matthews et al.

(10) Patent No.: US 9,929,970 B1
(45) Date of Patent: Mar. 27, 2018

(54) EFFICIENT RESOURCE TRACKING

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 188 days.

(21) Appl. No.: 14/958,830

(22) Filed: Dec. 3, 2015

(51) Int. Cl.
*G06F 15/173* (2006.01)
*H04L 12/911* (2013.01)
*H04L 12/26* (2006.01)

(52) U.S. Cl.
CPC ............. *H04L 47/70* (2013.01); *H04L 43/16* (2013.01)

(58) Field of Classification Search
CPC ..... H04L 47/70; H04L 43/16; H04L 41/0213; H04L 29/08072
USPC .................................................. 709/223, 224
See application file for complete search history.

(56) References Cited

U.S. PATENT DOCUMENTS

| | | | | |
|---|---|---|---|---|
| 3,673,395 A | * | 6/1972 | Tripp | G05B 19/40 318/611 |
| 4,985,859 A | * | 1/1991 | Rauner | G01P 3/489 324/166 |
| 5,457,793 A | * | 10/1995 | Elko | G06F 12/084 707/688 |
| 5,724,362 A | * | 3/1998 | Lau | H04L 1/24 714/704 |
| 5,923,247 A | * | 7/1999 | Dowden | H04L 43/16 340/500 |
| 6,363,411 B1 | | 3/2002 | Dugan et al. | |
| 6,400,715 B1 | * | 6/2002 | Beaudoin | H04L 49/25 370/392 |
| 6,527,370 B1 | * | 3/2003 | Courian | B41J 2/14016 347/47 |
| 6,646,604 B2 | | 11/2003 | Anderson | |
| 6,766,338 B1 | * | 7/2004 | Handley | G06F 17/17 341/61 |
| 6,779,030 B1 | | 8/2004 | Dugan et al. | |
| 7,246,156 B2 | | 7/2007 | Ginter et al. | |
| 7,890,509 B1 | | 2/2011 | Pearcy et al. | |
| 8,270,952 B2 | | 9/2012 | Raleigh | |
| 9,401,869 B1 | * | 7/2016 | Tang | G06F 9/5066 |
| 9,420,002 B1 | | 8/2016 | McGovern et al. | |
| 9,753,749 B2 | | 9/2017 | Gaston et al. | |
| 2002/0065864 A1 | | 5/2002 | Hartsell et al. | |

(Continued)

*Primary Examiner* — Thu Ha Nguyen
(74) *Attorney, Agent, or Firm* — Karl T. Rees

(57) ABSTRACT

Described techniques enable resource accounting and tracking in high access rate systems using low cost memories. A first set of counters is maintained in relatively lower cost memory. The first counters generally indicate the amount of resources used for each object in a set of objects, but on a potentially delayed basis. A second set of counters of smaller size is stored in a relatively higher cost memory that supports high arrival and departure rates for accurate accounting. Each second counter indicates the amount of resources assigned (or unassigned) to an object since the object's first counter was last updated, and is incremented or decremented whenever this amount changes. A background process is configured to update individual first counters from the corresponding second counters on a recurring basis. The exact times at which a given first counter is updated may vary in accordance with a variety of approaches.

20 Claims, 4 Drawing Sheets

(56) References Cited

U.S. PATENT DOCUMENTS

| | | | |
|---|---|---|---|
| 2003/0110344 A1* | 6/2003 | Szczepanek | H04L 12/40013 711/100 |
| 2006/0294252 A1* | 12/2006 | Shoji | H04L 43/0817 709/230 |
| 2007/0140301 A1* | 6/2007 | Kailash | H04L 43/024 370/498 |
| 2007/0174428 A1 | 7/2007 | Lev Ran et al. | |
| 2008/0117816 A1* | 5/2008 | Stone | H04L 43/0817 370/230.1 |
| 2009/0282096 A1* | 11/2009 | Kamrowski | H04L 67/16 709/203 |
| 2010/0228854 A1* | 9/2010 | Morrison | H04L 29/00 709/224 |
| 2011/0078519 A1 | 3/2011 | Yordanov et al. | |
| 2012/0278464 A1 | 11/2012 | Lehane et al. | |
| 2014/0270163 A1* | 9/2014 | Merchan | H04L 9/0637 380/46 |
| 2015/0133076 A1 | 5/2015 | Brough | |
| 2017/0060769 A1* | 3/2017 | Wires | H04L 12/6418 |
| 2017/0235622 A1 | 8/2017 | Boyapalle et al. | |
| 2017/0257303 A1 | 9/2017 | Boyapalle et al. | |
| 2017/0288955 A1 | 10/2017 | Yin | |
| 2017/0344045 A1 | 11/2017 | Forbes | |

\* cited by examiner

FIG. 3

| | 362a Full | 366 Thr |
|---|---|---|
| O1 | 0000147 | 0000200 |
| O2 | 0002987 | 0002000 |
| O3 | 0000013 | 0000200 |
| O4 | 0000401 | 0000400 |
| O5 | 0000898 | 0000900 |
| O6 | 0000096 | 0000200 |
| O7 | 0000002 | 0000200 |
| O8 | 0032548 | 0064000 |

| | 362b Full | 366 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000898 | 0000900 |
| O6 | 0000096 | 0000200 |
| O7 | 0000002 | 0000200 |
| O8 | 0032548 | 0064000 |

| | 362c Full | 366 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000002 | 0000200 |
| O8 | 0032548 | 0064000 |

| | 362d Full | 366 Thr |
|---|---|---|
| O1 | 0000147 | 0000200 |
| O2 | 0002987 | 0002000 |
| O3 | 0000021 | 0000200 |
| O4 | 0000394 | 0000400 |
| O5 | 0000902 | 0000900 |
| O6 | 0000097 | 0000200 |
| O7 | 0000003 | 0000200 |
| O8 | 0032543 | 0064000 |

| | 372a Int | 376a Sta |
|---|---|---|
| O1 | 00 | 0 |
| O2 | 00 | 1 |
| O3 | 08 | 0 |
| O4 | -07 | 1 |
| O5 | 03 | 0 |
| O6 | 02 | 0 |
| O7 | -02 | 0 |
| O8 | -01 | 0 |

| | 372b Int | 376b Sta |
|---|---|---|
| O1 | 01 | 0 |
| O2 | -01 | 1 |
| O3 | 00 | 0 |
| O4 | 00 | 0 |
| O5 | 04 | 0 |
| O6 | 01 | 0 |
| O7 | 00 | 0 |
| O8 | -03 | 0 |

| | 372c Int | 376c Sta |
|---|---|---|
| O1 | 00 | 0 |
| O2 | -03 | 1 |
| O3 | 02 | 0 |
| O4 | 00 | 0 |
| O5 | 00 | 1 |
| O6 | 00 | 0 |
| O7 | 01 | 0 |
| O8 | -05 | 0 |

| | 372d Int | 376d Sta |
|---|---|---|
| O1 | 02 | 0 |
| O2 | -02 | 1 |
| O3 | 04 | 0 |
| O4 | 01 | 0 |
| O5 | -01 | 1 |
| O6 | -01 | 0 |
| O7 | 00 | 0 |
| O8 | 00 | 0 | t0, t1, t2, t3

EFFICIENT RESOURCE TRACKING

TECHNICAL FIELD

Embodiments relate generally to resource management, and, more specifically, to techniques for managing resources in a computer system using efficient tracking of shared resource usage.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems may include a number of shared resources, such as memories, processors, storage units, network bandwidth, interfaces, and so forth. These resources are described as shared because they may be utilized by or on behalf of multiple logical or physical components of a computer system. For instance, in the context of a network switching device, usage of certain memory areas may be logically divided amongst different ports, queues, or other components of the device. Individual portions of these memory areas, referred to herein as buffers, may be utilized by or on behalf of device components to, for example, temporarily store network packets, cells, data frames, or other messages for processing. At a given time, each buffer may be classified as belonging to, being assigned to, or being utilized by one or more different physical or logical component of the networking device, such as a port, queue, group of ports, traffic class, and so forth. This classification will typically change over time, as the resource is repeatedly assigned, unassigned, and reassigned to different components for various purposes.

To minimize situations where usage of shared resources is inefficiently monopolized for certain functions, a computer system may include a resource management component for the shared resources. The resource management component may implement a variety of access control algorithms designed to optimize usage of a specific set of shared resources. For instance, the resource management component may allocate different amounts of a type of resource (e.g. a number of buffers, a memory size, a number of processors or threads, an amount of processor usage, bandwidth, etc.) for different objectives, and track the amounts of resources currently utilized for each objective. When additional resources are needed for an objective, beyond the amount already allocated for the objective, allocation of additional resources may be requested for the objective. When a resource is no longer needed, deallocation of the resource for the objective may be requested.

A resource management component may be configured to deny requests to allocate resources for certain objectives in certain situations. For example, the total number of resources that may be allocated to a given system component at a given instance of time may be limited by some threshold. Or, there may simply be no remaining resources available for allocation.

The task of resource management itself requires an amount of resources. For example, an amount of memory is required for accounting purposes, such as for tracking the current amount of resources utilized for each objective. Of course, as the number of objectives to which a type of resource may be assigned increases, the memory requirements also increase. Moreover, for certain types of usage patterns in certain types of computer systems, such as with respect to message buffers in network switching devices, the frequency with which resource assignments must be made requires that the memory used to track resource usage be capable of sustaining a high read and write rate. For instance, multi-ported memory is often required in such contexts, which can be of relatively high cost and reduced operating rate.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an example set of counters and status information changing over time in accordance with the described techniques.

DETAILED DESCRIPTION

Figure 1:
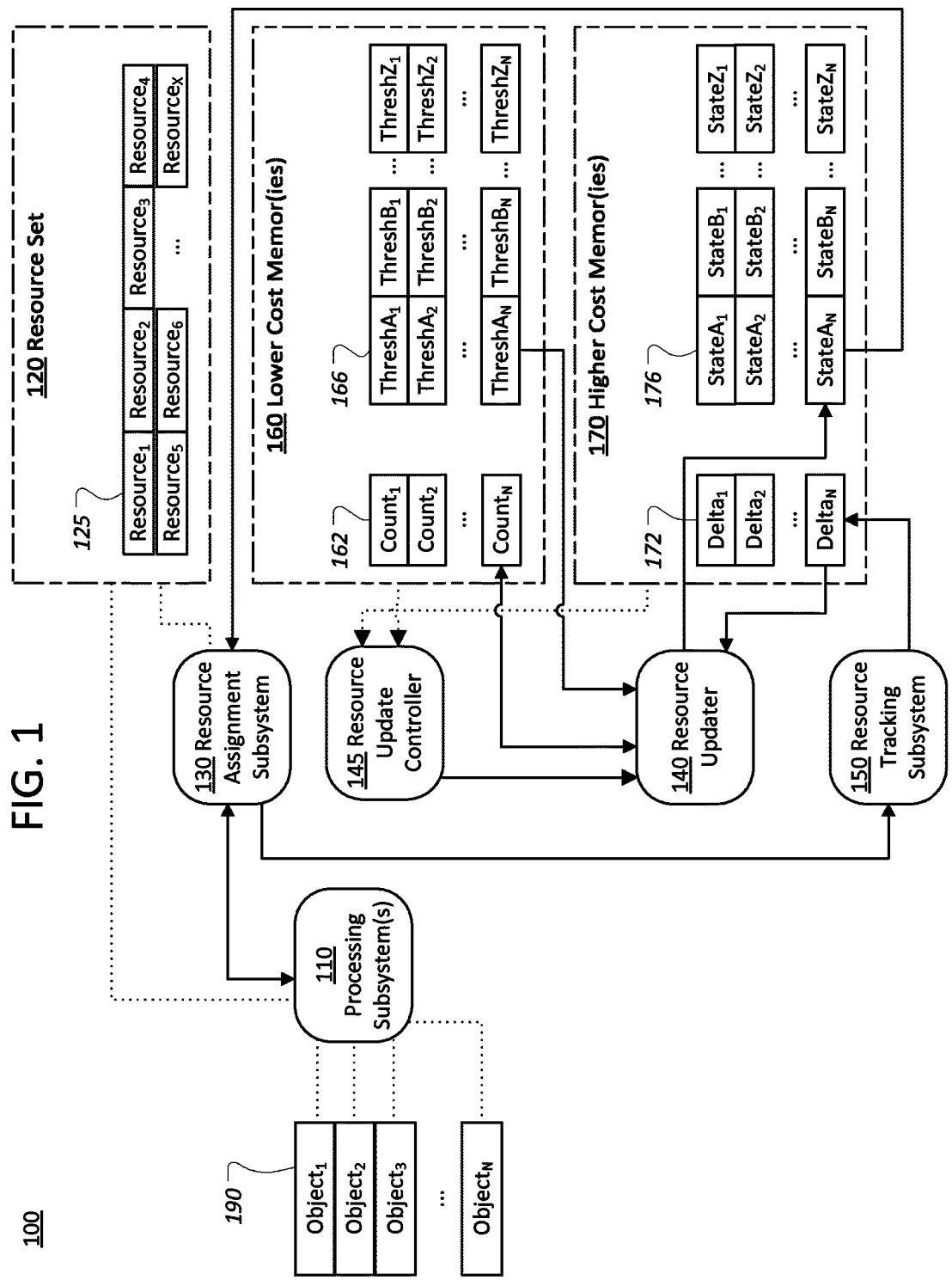
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Structural Overview
   2.1. Resources
   2.2. Objects
   2.3. Resource Assignment
   2.4. Full Counters
   2.5. Object Status Information
   2.6. Resource Tracking
   2.7. Resource Status Updates
   2.8. Memories
   2.9. Miscellaneous
   3.0. Functional Overview
   3.1. Resource Assignment Flow
   3.2. Unassigning a Resource
   3.3. Updating Status Information
   3.4. General Counting Flow
   4.0. Implementation Examples
   4.1. Example Update Selection Techniques
   4.2. Example Walk-through
   5.0. Example Embodiments
   6.0. Implementation Mechanism—Hardware Overview
   7.0. Extensions and Alternatives

1.0. General Overview

Approaches, techniques, and mechanisms are disclosed for tracking and/or managing resource utilization in a computer system using efficient tracking of shared resource usage. According to an embodiment, the techniques described herein enable resource accounting and tracking in high access rate systems using low cost memories. Among other aspects, the techniques shift at least some of the memory requirements for resource accounting and tracking mechanisms to lower cost memories, at the cost of an acceptable reduction in accuracy at a given moment in time on account of potential delays in updates to the accounting and tracking mechanisms.

According to an embodiment, resource usage is tracked at least partially through the use of counters. Two sets of counters are maintained for a set of resources, each set of counters having varying resolution and access capabilities. A first set of counters, also known as full resolution counters, full status counters, or full counters, is maintained in relatively lower cost memories. The full counters generally indicate the amount of resources used for each object in a set of objects (e.g. ports, queues, groups, categories, threads, etc.), but on a potentially delayed basis. A second set of counters of smaller size, also known as intermediate counters, delta counters, or shallow counters, is stored in a relatively higher cost memory that supports high arrival and departure rates for accurate accounting. Each intermediate counter indicates the amount of resources assigned (or unassigned) to an object since the object's full counter was last updated, and is updated whenever this amount changes. A background process is configured to update individual full counters from the corresponding intermediate counters on a periodic or other basis. The exact times at which a given full counter is updated may vary in accordance with a variety of suitable algorithms, such as those described herein.

The exact types of memories used to store the counters may vary between embodiments, so long as the memory used to store the intermediate counters supports higher read and/or write access rates than the memory used to store the full counters.

Access control and/or other logic may involve utilizing the full counters to determine various status information for an object relative to a type of resource, in spite of the fact that the full counters are not always up-to-date. This status information may indicate whether the object is in one or more defined states, depending on the implementation. Each given state is associated with a threshold. If the full counter is over the threshold, the object is said to be in the given state. In an embodiment, some or all of the status information for an object may be determined and stored when the full counter is updated, so that the determination need not be repeated until the next update to the full counter, thus avoiding or at least reducing the need to read the full counter between updates. In an embodiment, the status information for an object may be stored in any memory having faster read access than the memory used to store the full counter for the object, including without limitation the same memory used to store the intermediate counter for the object.

In an embodiment, different thresholds may exist for the same state for different objects. For example, in the context of a networking device, one port may be considered oversaturated when it has been assigned more than X buffers, while another may be considered oversaturated when it has been assigned more than Y buffers. In an embodiment, all objects have the same threshold for a given state. Depending on the embodiment, the state thresholds may be pre-configured, and/or updated over time in accordance with various rules and algorithms. In an embodiment, the thresholds may be stored in a memory of relatively low cost, including without limitation the same memory used to store the full counters.

In other aspects, the invention encompasses computer apparatuses and computer-readable media configured to carry out the foregoing techniques. Although the techniques described herein may be utilized in any system comprising any number of resources, objects, and computing devices, in one embodiment the techniques described herein may be more specifically applied to managing per-port or per-queue message buffers in a networking device such as a router or switch. The buffered messages need not necessarily be complete "messages" from the perspective of an end-user, but rather than the term message as used herein should be understood to refer to any unit of data involved in a transmission, such as segments, packets, data frames, cells, datagrams, and so forth.

2.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-190. For example, system 100 may comprise a single computing device in which some or all of the processing components described herein are implemented using application-specific integrated circuits (ASICs) or field programmable gate arrays (FPGAs). As another example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Resources

System 100 comprises a resource set 120 of resources 125. Resources 125 are each of a common resource type. Example resource types include, without limitation, buffers or other units of memory, processors, threads, interfaces, units of network bandwidth, units of processor utilization, I/O operations, computing devices, network resources, and so forth. Resource set 120 may include any number of resources 125.

System 100 further comprises one or more processing subsystems 110. A processing subsystem 110 is a set of hardware components, such as ASICs or FPGAs, and/or software-based processes executed by one or more processors. A processing subsystem 110 is configured to perform some task at least using resources 125 assigned from resource set 120. A processing subsystem 110 may be configured to perform any suitable task. However, the one or more processing subsystems 110 are collectively configured to perform tasks with respect to a number of objects 190.

For instance, within the context of managing per-port or per-queue message buffers in a networking device, processing subsystem 110 may be or include, without limitation, one or more of: a routing subsystem configured to forward routable messages to next destinations, a buffering component configured to buffer messages while waiting for a port or interface to become available to send the messages, a firewall subsystem configured to apply firewall rules and/or inspect packets, a packet manipulation subsystem, a general purpose processor, a traffic control subsystem, and so forth. Of course, the types of processing subsystems 110 that may be implemented may take a variety of other forms, and many embodiments are not limited to any specific type of processing subsystem 110. More generally, processing subsystem 110 may be any subsystem that maps objects to resources, using a one-to-one mapping, one-to-many mapping, or many-to-many mapping policy, based on the resources and/or user preferences.

2.2. Objects

Techniques described herein function to track, manage, and regulate the amount of resources that be utilized by the one or more processing subsystems 110 for or in association with a given object 190. Each object 190 corresponds to different and distinct task, function, or objective. An object 190 may be an actual physical or logical component of system 100, such as a processor, incoming or outgoing port, interface, computing device, and so forth. Thus, for instance, the amount of resources 190 that may be utilized for a given processor, port, or interface may be regulated in accordance with the techniques described herein. Or, an object 190 may correspond to any other suitable function or objective, such as queues, software processes or threads, data structures, classes or categories of operations, network addresses or subnets, defined groups of objects, and so forth.

In some embodiments, a separate processing subsystem 110 may exist for each object 190. For instance, if each object 190 is a port or queue, a separate hardware component or set of processes may be configured to process messages from each separate port or queue. A processing subsystem 110 may even be to some extent synonymous with the corresponding object 190, as may occur if each object 190 is a system thread. In other embodiments, there is not necessarily any correlation between the number of objects 190 and the number of processing subsystems 110.

2.3. Resource Assignment

Prior to utilizing a resource 125 in association with a given object 190, a processing subsystem 110 is configured to ensure that the resource 125 is assigned or allocated for use with the given object 190. To this end, system 100 comprises one or more resource assignment subsystems 130. A resource assignment subsystem 130 is a set of one or more hardware components and/or software processes configured to implement any suitable conflict resolution mechanism(s) to manage the assignment of specific resources 125 to specific objects 190. A processing subsystem 110 may, for instance, identify a specific object 190 for which a resource 125 is needed and request that the resources assignment subsystem 130 assign one or more resources 125 for use with respect to that specific object 190. In response, resource assignment subsystem 130 locates an available resource 125, if possible, and identifies the location of that resource to the processing subsystem 110.

When the processing subsystem 110 is done using the identified resource 125 for the specific object 190, resource assignment subsystem may then unassign or deallocate the identified resource 125 from the specific object 190. This deallocation process may occur, for example, responsive to an explicit request from processing subsystem 110, or responsive to yet another process or subsystem that identifies resources 125 that are no longer being used for a specific object 190 using garbage collection or other suitable techniques.

For instance, within the context of managing per-port or per-queue message buffers in a networking device, a resource assignment subsystem 130 may allocate or assign message buffers to routable messages as the routable messages arrive and/or are placed in a certain queue. The resource assignment subsystem 130 may unassign message buffers as the messages are disposed of, such as when the routable messages are routed to their next destination device, processed, passed off to a next processing component, discarded, and so forth.

For illustrative purposes, processing subsystem(s) 110 are depicted as conceptually separate from resource assignment subsystem 130. However, in some embodiments resource assignment subsystem 130 may actually be part of processing subsystem(s) 110. For instance, instead of sending allocation requests to a centralized resource assignment subsystem 130, each processing subsystem 110 may comprise logic equivalent to that of resource assignment subsystem 130. In systems 100 with multiple processing subsystems 110, an inter-subsystem signaling or messaging protocol may be used to ensure that resources 125 are not assigned to conflicting objects 190 at the same time.

In an embodiment, resource assignment subsystem 130 determines a resource 125 to be available for a specific object 125 if one or more resource assignment rules are met. These one or more additional rules include at least one rule based on the current value of a full status counter 162 or status indicator 176 associated with the specific object 125.

In an embodiment, resources 125 may be assigned to more than one object 190 simultaneously. For example, buffer resources consumed by a packet arriving on an ingress port may be assigned to the ingress port. Simultaneously, buffer resources consumed for the same packet departing from a given egress port may be assigned to the egress port. Thus a given buffer resource may be assigned to both objects (i.e. the ingress port and the egress port). This enables two concurrent views of buffer resource usage, with one view based on the source port and the other view based on the destination port.

2.4. Full Counters

Full status counters 162 may include one or more full counters 162 for each object 190. Each full counter 162 indicates a count of a number or amount of resources 125 currently assigned to the object 190 that is associated with full counter 162. The count may be accurate as of a last sample time for the object 190. However, the full counter 162 for an object 190 is not necessarily updated each time a new resource 125 is allocated to the object 190. Hence, at any given time, the full counter 162 is not necessarily an accurate count of the number of resources 125 assigned to the object 190 at that given time. The full counter 162 may thus be characterized as indicating an "approximate," "delayed," or "fuzzy" count of the number of resources 125 assigned to the object 190.

2.5. Object Status Information

Full counters 162 are used to determine status information for each object 190 with respect the allocation of resources 125 in resource set 120. In an embodiment, resource assignment subsystem 130 may be configured to determine the status information based on comparing the full counters 162 to thresholds 166. In other embodiments, the status information is determined by another subsystem, such as resource update controller 140, and then stored as state indicators 176.

In any case, the determined status information includes at least one state for each object 190. That is to say, the status of each object 190 is characterized with respect to one or more defined states. For instance, the depicted state indicators 176 describe the state of each object 190 with respect to a StateA, StateB, StateZ, and so forth. In an embodiment, each state indicator 176 may be a binary bit, indicating whether or not the object 190 is in a state corresponding to the state indicator 176. In another embodiment, each state indicator 176 may be more than one bit, allowing for more complex states, or indicating that the object 190 is a specifically enumerated state in a set of mutually exclusive states.

For each state, one or more thresholds 166 are defined. For instance, a threshold 166 may be a value against which a full counter 162 is compared. If the full counter 162 is above (or, in some embodiments, equal) to the threshold 166, the object 190 corresponding to the full counter 162 is said to be in the state associated with the threshold 166. As another example, thresholds 166 may define one or more ranges, lists, or sets of values associated with different states.

Various rules may be associated with the states. For instance, if an object 190 is said to be in a certain state, resource assignment subsystem 130 may be configured to throttle or altogether stop allocating new resources 125 for the object 190. Or, if an object 190 is said to be in another state, a notification subsystem may generate and send a notification message. Depending on the embodiment, rules and states may be pre-configured by one or both of a manufacturer or network administrator. Thresholds 166 may likewise be established. Or, in an embodiment 166, another subsystem may be configured to periodically evaluate and adjust thresholds 166 based on any of a variety of factors, such as historical usage trends or predicted operating needs.

In an embodiment, thresholds 166 may be different for different objects 190. For instance, in the context of managing per-port message buffers in a network device, different thresholds may be assigned to different outgoing ports. That is, one port may be allowed to use more buffers than another port. Or notifications may be triggered for one port sooner than for another port.

2.6. Resource Tracking

System 100 further comprises one or more resource tracking subsystems 150. A resource tracking subsystem 150 (also referred to as a counting subsystem) is a set of one or more hardware components and/or software processes configured to update intermediate counters 172 responsive to countable events, such as resource assignments or events that require resource assignments. While full counters 162 and state information 176 may not always accurately reflect the number of resources 125 currently assigned to an object 190, it is still necessary to track resource assignments. Thus, whenever resource assignment subsystem 130 assigns a new resource 125 to an object 190, or unassigns a resource 125 from an object 190, a resource tracking subsystem 150 updates an intermediate counter 172 for the object 190. Each intermediate counter 172 indicates the net change in resources assigned to its corresponding object 190 since the last sample time for the full counter 162 of the object 190 (i.e. when the full counter 162 of the object 190 was last updated).

For instance, each time a resource 125 is assigned for a specific object 190, the resource tracking subsystem may increment the intermediate counter 172 for the object 190 by one unit. Likewise, each time a resource 125 is unassigned for a specific object 190, the resource tracking subsystem may decrement the intermediate counter 172 for the object 190 by one unit. In embodiments where resources 125 are of different sizes (e.g. different memory sizes, unit sizes, etc.), the intermediate counter 125 may instead be incremented and decremented by an amount corresponding to the size of the assigned resource 125.

2.7. Resource Status Updates

System 100 further comprises one or more resource updaters 140 (also referred to as a status updater). A resource updater 140 is a set of one or more hardware components and/or software processes configured to update the full counters 162 based on the intermediate counters 172. More specifically, resource updater 140 updates a given full counter 162 by adding (or subtracting) the current value of the corresponding intermediate counter 172 to (or from) the full counter 162. The intermediate counter 172 is then reset to a value of zero.

In an embodiment, resource updater 140 is also configured to update state indicators 176. For instance, upon updating a full counter 162 for an object 190, resource updater 140 may also update the one or more state indicators 176 for the object 190 by comparing the new value of the full counter 190 to the appropriate threshold(s) 166.

The time at which resource updater 140 updates a given full counter 162 is referred to herein as the sample time or update time for the full counter 162 and its corresponding object 190. In an embodiment, system 100 comprises one or more resource update controllers 145. A resource update controller 145 is a set of one or more hardware components and/or software processes configured to control the timing of or schedule these update times by instructing a resource updater 140 to perform updates for the counters of specific objects 190 selected by the resource update controller 145 through various selection algorithms. Though depicted as a component that is separate from resource updater 140, it will be recognized that resource update controller 145 may also be integrated into the resource updater 140.

Generally, resource update controller 145 is configured to control update times in such a manner that updates to the full counters 162 occur less frequently than updates to the intermediate counters 172. In an embodiment, the updating of the full counters 162 may further be performed asynchronously relative to resource assignments and the events that trigger the resource assignments. That is, unlike the updating of intermediate counters 172, the updates to the full counters 162 occur on a schedule that is independent from and not responsive to resource assignments.

Resource update controller 145 may be configured to select specific objects to update at specific times in a variety of manners. For instance, resource update controller 140 may simply update the full counters 162 on a periodic basis. Or, resource update controller 140 may iteratively cycle through the full counters 162 and update them accordingly. In an embodiment, resource update controller 145 may select a certain number of full counters 162 to update each clock cycle (or each set of clock cycles). The specific full counters 162 updated during a given set of clock cycles may be chosen in a variety of manners, such as sequentially, randomly, based on a prioritization scheme, etc. In at least some embodiments, resource update controller 145 may have access to full counters 162, intermediate counters 172, thresholds 166, state information 176, or other information in memories 160 or 170, based upon which resource update controller 145 may make at least some determinations of which objects 190 to select for update at a given time. In an embodiment, resource update controller 145 schedules updates to full counters 162 only during downtimes, or in response to events such as detecting that the value of an intermediate counter 172 has surpassed some threshold. In an embodiment, resource update controller 145 varies the frequency with which full counters 162 are updated based on factors such as the foregoing.

In an embodiment, the full counters 162 for certain objects 190 may be updated whenever a new resource assignment occurs, while other full counters 162 may be updated in accordance to a schedule such as described herein. Various other examples of techniques for controlling or scheduling updates of the full counters 162 are described in subsequent sections.

2.8. Memories

According to an embodiment, full status counters 162 are stored in a first memory area 160 of relatively low cost, while intermediate counters 172 are stored in a second memory area 170 of higher cost but that supports a faster access rate. Thresholds 166 may also be stored in the first memory area 160, or another memory area of relatively low cost, while status indicators 176 may be stored in the second memory area 170 or another memory area of relatively high cost and faster access rate. For instance, the first memory area may be a single-ported memory, Dynamic Random Access Memory ("DRAM"), solid state storage device, and/or other relatively slow memory. By contrast, the second memory area may be a set of registers, multi-ported memory, DRAM, and/or other relatively fast memory.

This configuration leverages higher access rate of the second memory 170 to improve the efficiency of system 100 relative to simply using the first memory 160 to store counters and status information. Of course, a simpler approach to leverage the higher access rate of the second memory 170 would be to simply store all full counters 162 and thresholds 166 in the second memory 170, and to update the full counters 162 directly every time they change. However, the storage requirements for the full counters 162 and thresholds within the second memory 170 may be undesirably large. On the other hand, assuming sample times occur frequently enough, the storage requirements for each intermediate counter 172 may be much smaller than the number of bits required to store a full counter 162. Similarly, the storage requirements for a status indicator 176 may be much less than the storage requirements for a threshold 166. Hence, a much smaller amount of memory 170 is needed to take advantage of the higher access rates afforded by memory 170 using the described techniques.

In an embodiment, the maximum possible value of each intermediate counter is a function of the update strategy used by the resource update controller 140. Hence, the size of each intermediate counter 172 in the second memory 170 can be selected to be no bigger than necessary to store the maximum possible value of that intermediate counter 172. In an embodiment, the algorithm(s) utilized by resource update controller 145 may be such that certain objects 190 are guaranteed to be updated more frequently. Since certain objects 190 are guaranteed to be updated more frequently, the intermediate counters may accordingly be of varying sizes.

Moreover, in accordance with certain described techniques, the number of accesses to the full counters 162 and thresholds 166 can be greatly reduced to mitigate the impact of using the slower first memory 160 to store the full counters 162 and thresholds 166. While the intermediate counters 172 and status indicators 176 may be accessed any time a resource is assigned, which may be quite frequently, the full counters 162 and thresholds 166 may not actually need to be accessed at times other than their respective sample times. Thus the one or more memories 160 need not support the same high access rates as the intermediate counters 172 and status indicators 176.

On the other hand, not all embodiments require that counters 162 and 172 be stored in separate memories in order to realize certain advantages of the described techniques.

According to an embodiment, for convenience and potential reduction in read/write times, the threshold(s) for an object may be stored in close proximity to the full counter for the object (e.g. in a same record, in a same addressable unit of memory, in consecutive units of memory, etc.). Similarly, status information for an object may be stored in close proximity to the intermediate counter for the object.

According to an embodiment, full counters and thresholds are stored in single-ported memories, which allow for higher frequency clock cycles. However, other embodiments need not necessarily share this configuration.

2.9. Miscellaneous

System 100 as described above illustrates only some of the many possible arrangements of components that may be configured to provide the functionality described herein. Other arrangements may include fewer, additional, or different components, and the division of work between the components may vary depending on the arrangement. For example, although illustrated as separate components for conceptual purposes, logic for implementing components 130-150 may in fact be executed by a single component. As another example, in some embodiments, thresholds 166 and status indicators 176 may be omitted, along with any other components relied upon exclusively by the omitted component(s). As another example, intermediate counters 172 may be stored in a different memory than status indicators 176, and/or thresholds 166 may be stored in a different memory than full counters 162.

In an embodiment, there may be multiple types of objects 190. For instance, resources 125 may be assigned on a per-processor and per-interface basis. Or resource usage may be controlled at not only an outgoing port level, but also at a group-of-ports level and/or an incoming port level. Hence, counters and statuses may be tracked for both types of objects 190 concurrently, and resource assignment may be preconditioned on checking statuses for multiple objects 190 with respect to which the resource is needed.

3.0. Functional Overview

In an embodiment, the efficiency of resource management in a computer system is increased using a bifurcated counting technique to track and/or regulate resource usage on a per-component basis.

Figure 2:
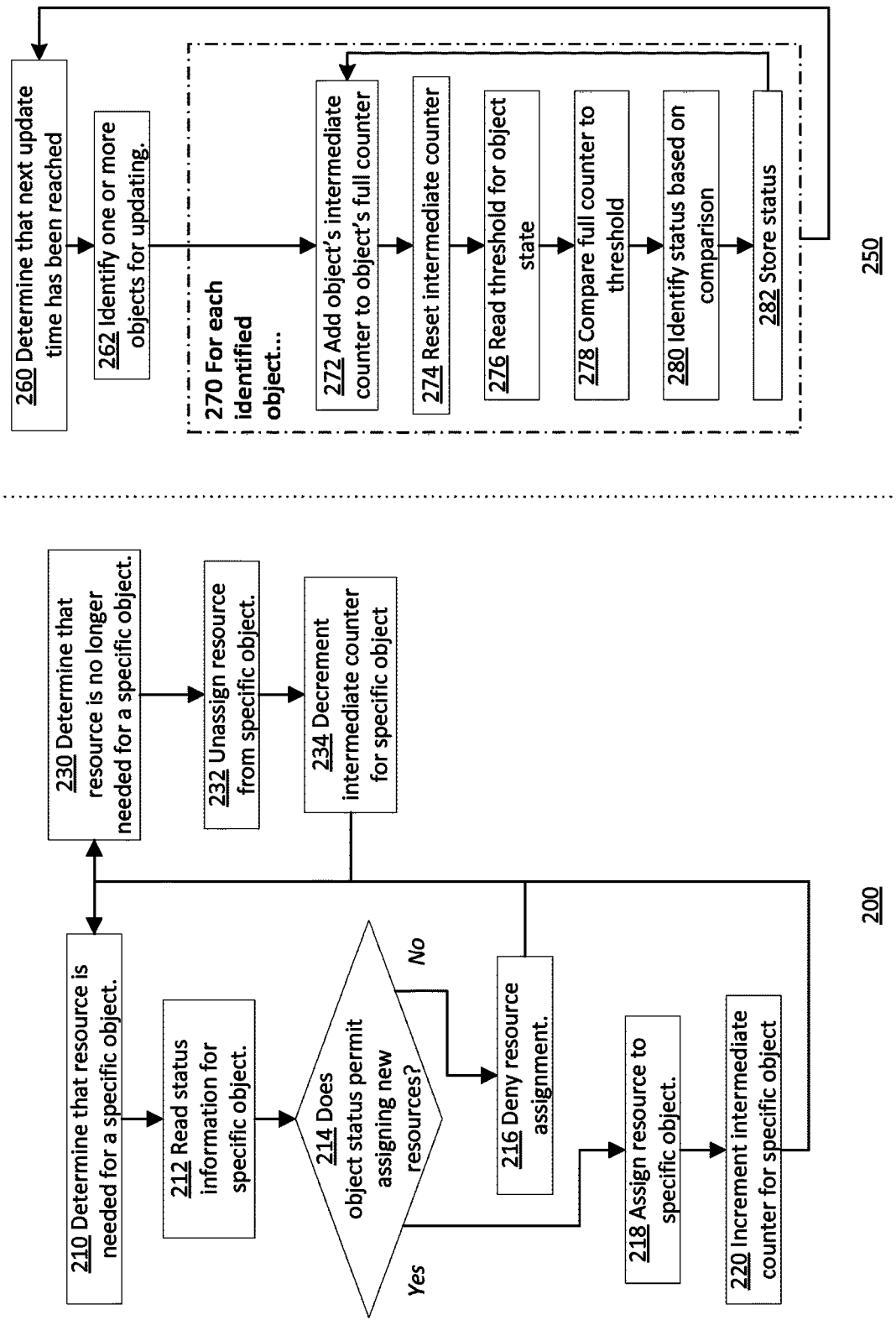
FIG. 2 illustrates example flows for tracking and managing resource usage.

FIG. 2 illustrates example flows 200 and 250 for tracking and/or managing resource usage, according to an embodiment. Flows 200 and 250 illustrate only some of the possible techniques for tracking and managing resource usage. Other flows may involve additional or fewer elements, in potentially different arrangements. The various elements of flow 200 and 250 may be performed concurrently for different resources, such that any number resource assignments or allocations are performed in parallel. Moreover, flows 200 and 250 may be repeated are performed concurrently with respect to the same objects but different resources. For instance, if an object resource assignments are being tracked for multiple types of resources at the same time, flow 200 and 250 may be performed for each type of resource, potentially in parallel.

The various elements of flows 200 and 250 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

For illustrative purposes, flow 200 and flow 250 are described below with respect to the example of message buffering in a networking device. However, the techniques are also applicable to a wide variety of systems in which resources may be assigned to different objects.

3.1. Resource Assignment Flow

Flow 200 is a flow for assigning resources, such as resources 125, to objects, such as object 190. Flow 200 begins at either block 210 or block 230. Block 210 comprises determining that a resource is needed for a specific object. A processing component such a processing subsystem 110 may be configured to perform block 110 in response to a certain event that is associated with the specific object. More specifically, the processing component is configured to perform a certain action in response to the event, and performance of this action requires the processing component to utilize the resource. Block 210 may also or instead comprise a resource assignment subsystem, such as subsystem 130, receiving a request from a processing component to assign a resource for the specific object.

For instance, in the context of message buffering in a networking device, block 210 may occur in response to receiving a message over a specific incoming port or a message destined for a specific outgoing port. The message may need to be stored in a message buffer for processing. For instance, the message may need to be buffered while the networking device determines a next device or address to which to route the address, applies one or more firewall rules, performs a deep packet inspection, manipulates message headers, performs traffic control, waits for an outgoing port to become available to send the message, and/or performs other actions with respect to the message. The number of available message buffers may be regulated on a per-port basis, in which case the specific object is the specific incoming port over which the message was received or the specific outgoing port to which the specific object is destined. Hence, block 210 comprises determining that a new message buffer is needed for the port.

Alternatively, or additionally, messages may be assigned to queues based on any of a variety of factors. For example, messages from a same set of ports may all be deemed to belong to the same queue. Or messages from the same port may be assigned to different queues based on service classes, destination addresses, or other characteristics of the messages. Message buffers may be regulated on a per-queue basis, in which case the specific object is the queue to which the message will be assigned.

Block 210 may, in some embodiments, further comprise identifying an amount of the resource that is needed. For instance, a size of memory to be allocated may be identified. In other embodiments, resources are assigned on a unit-by-unit basis, and all units are of the same size. Thus no specific amount is specified.

Block 212 comprises accessing status information for the specific object. The status information indicates whether the specific object is in a particular state. Assuming the status information is already stored, such as in state indicators 176, the status information may be read from an appropriate state indicator for the object. In some embodiments, block 212 may comprise reading multiple state indicators for multiple states.

Block 214 comprises determining whether, in view of the status information accessed in block 212, new resources can be assigned to the specific object. If so, then flow proceeds to block 218, in which a resource may be assigned to the specific object. If not, then flow proceeds to block 216, in which no resource is assigned to the specific object. For instance, block 214 may comprise executing hard-coded logic that branches to blocks 216 if a particular state is set, and branches to block 218 if the particular state is not set. Or, block 214 may comprise executing more complex logic based on the status information, such as a function of both whether the object is in a particular state as well as whether the object is in one or more additional states. The logic may instead be described by a configurable rule, which may be loaded from storage and evaluated with respect to status information.

In some embodiments, block 216 comprises terminating processing of whatever action or event required the resource. For instance, in the context of message buffering in a network device, the incoming message may simply be discarded. In an embodiment, block 216 may comprise sending a response to a processing component that requested the resource assignment. The response may indicate that the request has been denied. In some embodiments, in response to flow 200 branching to block 216, a processing component may, after waiting certain amount of time, repeat blocks 212 and 214 until a resource can be assigned, until a timeout period has lapsed, or until some other terminal condition is met.

Assignment of the resource in block 218 may comprise a variety of steps, depending on the embodiment. For instance, block 218 may comprise locating a specific resource that is available and returning an identifier or address of the resource. Block 218 may or may not also involve certain steps to ensure that the resource is no longer considered available for assignment to other objects, such as marking the resource as assigned in a resource map, placing a lock upon the resource, or not providing the location of the resource to a resource allocator while the resource is consumed. In the context of message buffering in a network device, the incoming message may be loaded into an available message buffer and processed accordingly.

In an embodiment, a number of determinations in addition to that of block 214 are made before proceeding to block 218, such as applying rules based on other states, checking a resource map to ensure that a resource (or a sufficient amount of resources) is in fact available, and so forth. Such determinations may be made before or after block 214, and if any of these determinations fail, flow may likewise proceed to block 216.

In an embodiment, one such determination may be to check the states of other objects implicated by the resource assignment. For instance, in the context of message buffering, a network device may limit the number of message buffers both with respect to per-port quotas and per-queue quotas. The determination of block 210 may involve identifying both a queue and a port to which the message pertains. Hence, status information is read for both the identified queue and the identified port in block 212. If the state of either the port or the queue does not permit the assignment of a new message buffer, the message may be dropped.

From block 218, flow proceeds to block 220. Block 220 comprises incrementing an intermediate counter for the specific object, such as an intermediate counter 172. In embodiments where resources are assigned on a unit-by-unit basis with units of the same size, the intermediate counter is always incremented by the same amount (e.g. one). In embodiments where different amounts of resources can be assigned, the intermediate counter may be incremented by a value that is proportional to the amount of resources being assigned.

According to an embodiment, block 214 may be replaced by a more general step of determining whether the status information places any constraints on the assignment of a resource to the object. For example, one or more rules may be associated with certain states when those states are currently assigned to the object. One of these rules may be that the resource will not be assigned, as is depicted in block 216. For instance, as mentioned above, if the resource is a message buffer and the processing task involves buffering an incoming message, the message may be dropped. In some embodiments, alternative blocks may be performed instead of or in addition to block 216. For example, the status information may indicate that one or more actions should be performed, and block 216 may instead involve performing these actions. In the context of message buffering in a network device, for instance, certain status information may indicate to go ahead and assign the resource, but to also apply flow control when processing the message. Or, the status information may indicate to go ahead and assign the resource, but also to mark a packet with a certain flag or designation. Any other suitable one or more actions may be performed based on the status information.

3.2. Unassigning a Resource

Block 230 comprises determining that a resource is no longer needed or being utilized for a specific object, and thus no longer needs to be mapped or assigned to the object. Block 230 may occur, for instance, automatically upon a processing component concluding a processing task for which it requested assignment of the resource for the specific object in block 210. For instance, in the context of message buffering, block 230 may be performed whenever he message is finally processed, disposed of, routed, sent, or moved to another processing queue. Block 230 may also or instead comprise receiving a specific request to unassign a specific resource from a specific object. As yet another example, block 230 may be performed in response to a background process detecting that a specific resource assigned to a specific object is no longer locked or in use, or that the specific object no longer exists (e.g. in the case of objects that correspond to threads, data structures, categories, and so forth).

Block 232 comprises unassigning the specific resource from the specific object. Block 232 may comprise a variety of steps, depending on the embodiment. For instance, steps may be taken to reverse any actions taken during assignment of the specific resource in block 218, such as unlocking the resource, listing the resource as free in a resource map, and so forth. Block 234 comprises decrementing the intermediate counter for the specific object. For instance, the intermediate counter may be reduced by an amount corresponding to the amount the intermediate counter was incremented in block 220.

From blocks 220 and 234, flow 200 may return to either block 210 or 230 for assigning or unassigning other resources for the same object and/or for different objects.

3.3. Updating Status Information

Flow 250 is a flow for updating counter and/or status information of objects to which resources may be assigned, per flow 200. Both flow 200 and flow 250 are performed on an ongoing basis during the operation of the system in which they are implemented. Flow 200 is performed whenever events that trigger a resource assignment (or unassignment) occur. Meanwhile, flow 250 may be performed less frequently and/or asynchronously relative to flow 200. For instance, flow 200 may be performed in response to each resource assignment or other trackable event, while flow 250 is performed periodically or on some other schedule independent of resource assignments or trackable events.

Flow 250 begins with block 260. Block 260 comprises determining that a next update time has been reached. Block 260 may occur, for example, on a periodic basis, such as once every clock cycle, once every other clock cycle, once every n clock cycles, every second, and so forth. Block 260 may also or instead occur at previously scheduled times. Block 260 may also or instead occur in response to certain events, such as detecting that an intermediate counter is above a threshold, or detecting that a measure of processor utilization is below a certain percentage.

Block 262 comprises identifying one or more objects whose counters and status information are to be updated. For instance, the objects may be arranged in an arbitrary "round-robin" sequence, and each iteration of flow 250 may involve selecting a next object in the sequence, or a next group of objects in the sequence. Once the sequence is complete, the sequence may be repeated. Thus, for example, a first and second object may be chosen in the first iteration of flow 250, a third and fourth object may be chosen in the second iteration of flow 250, and so forth, until the end of the sequence is reached, and the first two objects are selected again. A variety of other techniques of varying sophistication may also or instead be used to identify the one or more objects, and these techniques are described in greater detail in subsequent sections.

In an embodiment, a fixed number of objects are selected in each iteration. In other embodiments, there is a maximum number of objects that may be selected, but fewer than the maximum number of objects may instead be selected. Any number of objects may be selected, including zero or one. In some embodiments, the efficiency of the described technique may be increased when significantly fewer than the total number of objects are selected. When choosing the fixed number of objects to update per iteration, consideration may be taken of a number of factors, such as the amount of memory needed to store the intermediate counters (as explained in previous sections), the maximum amount of error that is acceptable in full counters (also as explained in previous sections), the amount of processing resources needed to perform the updating, and so forth.

Block 270 comprises updating the counters and status information for each identified object. In an embodiment, block 270 comprises, for each identified object, performing blocks 272-282.

Block 272 comprises adding an object's intermediate counter to the object's full counter. As a result of the ongoing performance of flow 200, the intermediate counter should reflect the net change in resource assignments since the object's full counter was last updated (i.e. since the object's last sample time). Thus, in some embodiments, adding the intermediate counter to the full counter may result in the full counter at least temporarily storing an accurate count of the number of resources assigned to the object. The full counter may thus be viewed as a snapshot of the number of resources assigned to the object at the object's last sample time. Note that, if the intermediate counter is in fact negative in value on account of a greater number of resources having been unassigned since the object's status was last updated, the result of block 272 is that the full counter will decrease.

According to some embodiments, updates to full counters may be optimized utilizing a read-modify-write operation such that only two memory access are required of the slower memory. A read operation reads the current full counter value. This value is then incremented by the corresponding intermediate counter value. The updated full counter may then be written back to the same location. In an embodiment, the read-modify-write operation may be accomplished in a single clock cycle if two-ported memory is used to store the full counter. In other words, a first memory port is used to read the current value of the full counter, and a second memory port is used for writing back the updated value. In another embodiment, the read-modify-write operation may be performed over two clock cycles if single-ported memory is used to store the full counter. That is, on the first cycle, the memory port is used to read the current value of the full counter, while on the next cycle, the updated value is written back using the same memory port. This embodiment supports higher operating frequencies for the memory used to store the full counter, at the expense of reducing the rate at which full counters may be updated, thus increasing the potential amount of inaccuracy in the full counters.

Block 274 comprises resetting the intermediate counter to zero, since the intermediate counter counts resource assignments since the last sample time, and the last sample time by definition has just occurred. In an embodiment, blocks 272 and 274 may be performed using a transaction or other locking mechanism designed to ensure that no resource assignments occur between block 272 and block 274, which would effectively result in the resource assignment not being counted. However, in other embodiments, the expected loss in accuracy from such occurrences is small enough in both magnitude and cost to warrant foregoing any locking mechanism.

Block 276 comprises reading threshold information for an object's state. For example, block 276 may comprise reading a threshold 166. Depending on the embodiment, thresholds may be read at the same time as the full counter, or at separate times. Block 278 comprises comparing the full counter, as updated in block 272, to the threshold information. Block 280 comprises, based on the comparison, identifying status information for the object. Block 282 comprises storing the status information.

For example, the threshold read in block 276 may indicate a value above which an object is considered to be in a flow control state. Block 278 may thus comprise determining whether the full counter for the object is above the threshold value. Block 280 may comprise setting a bit for the flow control state to 0 or 1, depending on whether full counter is above the threshold value. In other embodiments, more complex thresholds and comparisons may be involved in identifying the status of the object, such as thresholds based on ranges and/or that define non-binary states.

In an embodiment, blocks 272-282 may be repeated for any number of possible states for an object.

Both the frequency with which flow 250 is performed and the number of full counters that are updated in each pass of flow 250 may, in some embodiments, be adjusted. These factors, as well as the frequency with which resource assignments or trackable events may occur, may be utilized to select a suitable size (e.g. number of bits) for the intermediate counters, so as to ensure that the intermediate counters do not grow to a value larger than can be stored. Conversely, the frequency with which full counters are updated may be adjusted dynamically based on the sizes of the intermediate counters and/or the whether any intermediate counters are at risk to exceed their maximum values. For instance, updates to some or all of the full counters may be skipped to conserve processing power if their corresponding intermediate counters are not at risk for exceeding their maximum magnitudes before the full counters are scheduled for their next update.

As already described, the update frequencies may also be used to determine an expected deviation in the accuracy of the full counters (e.g. an upper limit for how inaccurate, on average, the full counters are expected to be at any given time). In an embodiment, thresholds for a certain type of state (e.g. a state used for determining whether to deny resource assignment requests) may be selected such that the sum of each object's threshold for the state plus the expected deviation does not surpass the total number of available resources. This expected deviation (and hence the thresholds) may be adjusted over time based on historical data such as, for example, how large the intermediate counters actually tend to grow.

In an embodiment, different processes or components may be responsible for updating the full counters and the status information. That is, there may be one component executing one flow for updating full counters, and another component executing another flow for updating statuses.

3.4. General Counting Flow

According to an embodiment, the techniques described herein may more generally be performed for a wide variety of counting applications other than resource management. For instance, according to one flow, the techniques described herein may be performed to track any sort of countable event. Any time a countable event occurs, an intermediate counter such as intermediate counter 162 may be incremented or decremented by amount associated with the countable event. A separate process may update full counters such as full counters 172 on a periodic or other basis, in similar manner as flow 250. Multiple counters may use to track different types of countable events and/or countable events associated with different components, classes, metadata, data structures, entities, or other objects.

Such a generalized flow may or may not involve maintaining and updating status information. The full counters may nonetheless be used in making a wide variety of state-based or other determinations for which a "delayed" or "stale" count is acceptable, rather than completely accurate count. Moreover, some applications may benefit from storing intermediate counters in a separate type of memory than the full counters, while others may not.

4.0. Implementation Examples 4.1. Example Update Selection Techniques

As explained previously, a variety of techniques may be used to identify the one or more objects whose counter(s) require updating in a given update cycle (e.g. in a given iteration of flow 250). For instance, the objects may be arranged in an arbitrary "round-robin" sequence, and selected accordingly. As another example, the identified objects may be selected at random.

As yet another example, the identified objects may be the objects whose intermediate counters have the highest magnitude. This approach is also referred to as a "FindMax" approach. For instance, the objects may be sorted by value or absolute value of their respective intermediate counters. Or, the identified objects may be a set of objects whose intermediate counters values are over a current threshold.

Hybrid selection techniques may also be utilized. For example, every odd iteration of flow 250 may involve selecting a random set of objects, or the next set of objects in an arbitrary round-robin sequence, while every even iteration may involve selecting the objects having the highest current magnitude. Or, every first iteration may involve selecting a pre-defined and specific set of objects, while every second and third iteration may involve selecting the next objects in the round-robin sequence. As yet another example, one object updated in every iteration may be selected from an arbitrary round-robin sequence, another object updated in every iteration may be selected from a group of objects dynamically calculated to be high-priority objects, and another object updated in every iteration may be selected from a group of manufacturer-designated high priority objects.

More generally, the hybrid selection technique may alternate between two or more selection strategies in different iterations, or utilizing multiple selection techniques to select multiple objects in a single iteration. Certain strategies may even be repeated or utilized more frequently than others.

In an embodiment, hybrid selection techniques may be designed so as to include, either in a single iteration or over the course of multiple iterations, both objects selected using strateg(ies) intended to ensure that all counters are updated within a certain amount of time (e.g. round robin strategies that cycle through a sequence of all objects over a given number of iterations), and objects selected using strateg(ies) that would rarely or never select objects deemed to be lower in priority. A strategy designed to ensure that all counters are updated within a certain amount of time shall herein be considered to be a baseline strategy, and updates made as a result of this process shall be considered "regular" updates. Strategies utilized as part of a hybrid selection technique outside of the baseline strategy are considered optimizing strategies, and updates made as a result thereof referred may be referred to as irregular updates.

The FindMax strategy is thus one example of a strategy that may be utilized as an optimizing strategy. As another example, rather than sorting by current magnitude, a background process may track the magnitudes of the intermediate counters over time, and periodically sequence the objects based on their average historical magnitude. An optimizing strategy may thus select the object(s) with highest average historical magnitude. As yet another example, a user may designate certain objects as high priority objects, and an optimizing strategy may thus select these high priority objects.

Another optimizing strategy may involve sorting the objects by the differences between their respective full counters and thresholds, such that the object(s) that are currently closest to their respective thresholds are selected. As yet another example, the average proximity of a full counter to a threshold may be calculated over time and used to prioritize its corresponding object. Objects may also or instead be sorted by functions that are based on any of the foregoing factors.

As an alternative to sorting objects by some or all of the foregoing factors, a similar optimizing strategy may be to simply maintain state information indicating when an object is currently considered to be of higher priority for update purposes. This "high update priority" state may be updated periodically (e.g. during regular updates to the full counter, in similar manner to the rest of status information 176). The objects may then be arranged in a sequence. This sequence may omit objects that are not currently in the high update priority state. Or, any objects within the sequence that are not within the high update priority state may be ignored during the selection process. For instance, an object may be considered to be in the high update priority state when it is within a certain amount or percentage of its threshold. The amount may be, for instance, the maximum possible error amount in the object's full counter (as calculated based on the baseline strategy) or a function thereof. The object would thus be available for selection by an optimizing selection technique, whereas an object not in the high update priority state would not be selectable.

As another optimizing strategy, or even as an alternative to a hybrid selection technique, a weighted or biased selection strategy may be utilized. Objects may be prioritized by intermediate counter magnitude, average intermediate counter magnitude, current full counter threshold proximity, average full counter threshold proximity, current state, user priority designations, object type, predicted use, and/or any other factor. The objects may be assigned weights based on these priorities. A weighted or biased approach to scheduling, such as a weighted lottery random selection algorithm or a weighted round-robin sequence, may then be used to select the objects in block 262.

For example, continuing with the example of per-port messaging queues in a networking device, the networking device may include both 1 Gbps ports and 10 Gbps ports. The ports may be treated as different object types, weighted differently for scheduling purposes. Updates may be scheduled in a weighted fashion such that the 10 Gbps ports are more likely (e.g. 2× more likely, 10× more likely, etc.) to be updated in any given iteration than the 1 Gbps ports. That is, for instance, a schedule may be designed whereby different objects may be assigned to different schedule slots. Assuming the 10 Gbps ports are weighted 10:1 relative to the 1 Gbps ports, for every ten schedule slots assigned to a 10 Gbps port, a 1 Gbps port would be assigned to one schedule slot. This approach may be hybridized with one or more other approaches, such as the FindMax approach described above.

According to an embodiment, instead of utilizing a round-robin approach, the baseline strategy may be used to select objects whose full counters are most stale. For instance, the times of object updates or number of clock cycles since an object was last updated may be tracked. The baseline approach may select the object(s) whose time or number of clock cycles since last being updated is largest.

The actual determination of which object(s) are to be updated may occur as needed (e.g. in the same clock cycle or period as the object is needed), or in advance. As an example of the latter, a resource update controller subsystem may separately generate and update an array of schedule slots. The resource update controller subsystem may populate the slots with object-identifying information in a sequence based on one or more of the foregoing techniques. When it comes time to perform an update, the resource updating subsystem may "pop" the identity of the next object(s) to update off the array. Empty slots may be generated to indicate periods when no updates are to be performed. As yet another example, a resource update controller may generate and maintain an internal schedule of times to perform updates for specific objects, and command a resource updating subsystem to perform updates for the specific objects when their scheduled times arrive.

4.2. Example Walk-Through

FIG. 3 is a diagram 300 that illustrates an example set of counters and status information changing over time in accordance with the described techniques, according to an embodiment. Diagram 300 more specifically depicts counters and other information for objects 390, labeled as O1 through O8. For each object 390, a full counter 362 and threshold 366 are stored in a first memory location (e.g. a lower cost memory), and an intermediate counter 372 and state bit 376 are stored in a second memory location (e.g. a higher cost memory). For simplification of discussion, all data is depicted in decimal form rather than as bits or bytes. Nonetheless, as illustrated, the amount of memory (i.e. the number of bits or bytes) used to store intermediate counters 372 is significantly smaller than used to store full counters 362, on account of assumptions that the update process illustrated herein prevents the intermediate counters 372 from growing more than a certain amount.

FIG. 3 depicts the state of the foregoing with respect to four instances in time, referred to as t0 through t3. Each time corresponds to a new update. The times may be evenly incremented. For instance, each time may correspond to a new clock cycle, or a new set of clock cycles, in a succession of clock cycles. Or, the times may be times at which updates have been scheduled, without necessarily being evenly incremented.

At t0, full counters 362 have full counter values 362a, intermediate counters 372 have intermediate counter values 372a, and state bits have state bit values 376a. As illustrated by the bolded outlining of their corresponding data, two objects have been recently updated—O1 and O2. These objects were selected for update using a round-robin approach. Their corresponding intermediate counter values 372a have been reset to 0. The state bit values 376a for O2 and O4 are set, on account of their corresponding full counter values 362a being higher than their respective thresholds 366.

At t1, a number of countable events (e.g. resources allocated and deallocated) have occurred since t0. For each countable event, the intermediate counter 372 has been increased or decreased by 1. These countable events have resulted in net increases to intermediate counter values 372b for certain intermediate counters 372 (e.g. for O1 and O5), and net decreases to the intermediate counter values 372b for other certain intermediate counters 372 (e.g. for O2 and O8) relative to t0. For example, one negative countable event has occurred for O2, lowering its intermediate counter value 372b to −01, while two positive countable events have occurred for O7, raising its intermediate counter value 372b to 00.

Objects O3 and O4 have been selected for update at t1. Consequently, the values of their intermediate counters 372a from t0 have been added to the values of their full counters 362a from t0 to arrive at the full counter values 362b for O3 and O4. Meanwhile, their intermediate counter values 372b have been reset to 0.

Furthermore, at t1, the full counters 362b for O3 and O4 have been compared to their respective threshold values 366. This comparison has indicated that the full counter values 362b for neither O3 nor O4 are above their respective thresholds 366, and thus the respective state bit values 376b for O3 and O4 are not set. This means, for instance, that the state bit 376b for O4 is now different than the state bit 376a, since the full counter 362b for O4 (394) has been decreased below the threshold 366 for O4 (400) on account of adding the intermediate counter value 372a for O4 (−07) to the full counter 362 for O4 (401).

All other full counter values 362b and state bit values 376b are not affected by the update to O3 and O4.

At t2, again a number of countable events have occurred, resulting in the intermediate counter values 372c. Objects O5 and O6 are updated, resulting in their full counter values 362c and state bit values 376c. Their intermediate counters 372c have been reset.

At t3, again a number of countable events have occurred, resulting in the intermediate counter values 372d. Objects O5 and O6 are updated, resulting in their full counter values 362d and state bit values 376d. Their intermediate counters 372d have been reset.

The process may then repeat at a time t4, with O1 and O2 again being updated, followed by O3 and O4 at a time t5, and so forth.

It will be noted that, for illustrative purposes, the embodiment depicted in FIG. 3 involves a relatively small number of objects 390. Other embodiments may include many more objects 390, along with intermediate counters 372, thresholds 366, and full counters 362 that grow significantly larger in size. Moreover, each object 390 may be associated with one or more additional thresholds 366 corresponding to one or more additional state bits 372.

While FIG. 3 illustrates a round-robin update technique, it will also be clear that alternative selection techniques may likewise be implemented, such as described above. For example, a hybrid selection policy may be implemented by selecting two objects using a round-robin baseline strategy at even times (e.g. t0, t2, etc.), and selecting two "high priority" objects using an optimizing strategy at odd times (e.g. t1, t3, etc.). For example, supposing O8 and O5 were historically high in volume, O8 and O5 may be selected at t1 per the optimizing strategy, O3 and O4 would then be selected at t2 per the round-robin strategy, O8 and O5 would then be selected again at t3 per the optimizing strategy, O5 and O6 would be selected at t4 per the round-robin strategy, and so forth. In some embodiments, the pool of high priority objects may be greater than two, in which case the optimizing strategy may select different objects each time. Moreover, other embodiments may update a smaller or greater number of objects than two at each time.

5.0. Example Embodiments

Examples of some embodiments are represented, without limitation, in the following clauses:

According to an embodiment, a networking apparatus comprises: communication interfaces coupled to one or more networks, the communication interfaces configured to receive and send messages; a routing subsystem configured to process routable messages received over the communication interfaces; one or more first memories configured to store full status counters; one or more second memories configured to store intermediate counters, the one or more second memories being different than the one or more first memories, each of the intermediate counters corresponding to a different one of the full status counters; a counting subsystem configured to increment the intermediate counters responsive to the communication interfaces receiving the routable messages and to decrement the intermediate counters responsive to the communication interfaces sending the routable messages and/or the routing subsystem disposing of the routable messages; a status update subsystem configured to update the full status counters by: adding the intermediate counters to the full status counters to which the intermediate counters respectively correspond, and resetting the intermediate counters; an update controller configured to identify times for the status update subsystem to update specific full status counters of the full status counters.

In an embodiment, the apparatus further comprises: a threshold application subsystem configured to compare thresholds to the full status counters, and to assign states to the full status counters based on the comparing, different thresholds corresponding to different assigned states; wherein the one or more second memories further store status indicators of the assigned states.

In an embodiment, the one or more first memories store one or more of the thresholds in association with each of the full status counters, wherein the threshold application subsystem is configured to read associated thresholds concurrently with the status update subsystem reading corresponding full status counters.

In an embodiment, the one or more first memories are single-ported memories, wherein the one or more second memories are multi-ported registers.

In an embodiment, the one or more second memories further store status indicators, each of the full status counters corresponding to a different set of one or more status indicators; the status update subsystem is further configured to update the status indicators responsive to and based on updating the full status counters to which the status indicators respectively correspond; and the routing subsystem is configured to use the status indicators to determine how to process at least certain messages of the routable messages.

In an embodiment, the full status counters include a full status counter for each object of a plurality of objects, the plurality of objects being a plurality of ports or a plurality of message queues; the intermediate counters include an intermediate counter for each object of the plurality of objects; the status indicators include at least one state indicator for each object of the plurality of objects; and the routing subsystem is configured to use the state indicator for a given object to determine whether to discard messages received via or destined for the given object.

In an embodiment, the update controller is configured to only update a limited number of the full status counters in a given set of one or more clock cycles, wherein the counting subsystem is not restricted to updating the limited number of the intermediate counters in the given set of one or more clock cycles.

In an embodiment, the update controller selects which specific full status counters to update in which specific set of one or more clock cycles using logic configured both to select each of the full status counters at least once in a given period of time, and to select certain full status counters determined to be of high priority more frequently than other full status counters.

In an embodiment, each given full status counter of the full status counters corresponds to a different object and indicates an amount of message buffers assigned to the object at a time when the given full status counter was last updated.

According to an embodiment, a system comprises: a tracking subsystem configured to update intermediate counters responsive to countable events, the intermediate counters including a separate intermediate counter for each object of a plurality of objects; a resource update subsystem configured to: update resource status counters based on the intermediate counters, the resource status counters including a separate resource status counter for each object of the plurality of objects; update status indicators based on comparing the resource status counters to one or more corresponding thresholds for the status indicators, the status indicators including at least one separate status indicator for each object of the plurality of objects; and a resource update controller configured to select times at which the resource update subsystem updates individual resource status counters of the resource status counters for individual objects of the plurality of objects.

In an embodiment, the system further comprises: one or more first memories configured to store the resource status counters; and one or more second memories configured to store the intermediate counters and the status indicators, the one or more second memories being different types of memories than the one or more first memories.

In an embodiment, the system further comprises: shared system resources, each of the shared system resources being of a same resource type; one or more processing subsystems configured to utilize the shared system resources with respect to the plurality of objects; one or more resource assignment subsystems configured to assign specific resources of the shared system resources for use with specific objects of the plurality of objects, and further configured to determine whether to assign a new resource of the shared system resources for use with a given object based on a given status indicator of the status indicators, the given status indicator corresponding to the given object.

In an embodiment, the resource update subsystem is configured to update each given resource status of the resource status counters by adding a corresponding intermediate counter of the intermediate counters to the given resource status counter and resetting the corresponding intermediate counter; the resource update subsystem is configured to update each given status indicator of the status indicators by comparing a corresponding resource status counter of resource status counters to at least a given threshold that corresponds to the status indicator; and the tracking subsystem is configured to update a given intermediate counter of the intermediate counters in response to a given event of the countable events comprises incrementing or decrementing the given intermediate counter by an amount associated with a given event.

In an embodiment, the resource update subsystem is configured to update the resource status counters and status indicators less frequently than the tracking subsystem is configured to update the intermediate counters.

In an embodiment, the one or more first memories are configured to store the one or more corresponding thresholds, and at least a first object of the plurality of objects has a different corresponding threshold than a second object of the plurality of objects.

According to an embodiment, a method comprises: maintaining a delayed resource status counter in a first memory; maintaining a delayed status indicator in one or more registers, other than the first memory; maintaining an intermediate counter in the one or more registers; updating the intermediate counter as events occur; updating the delayed resource status counter and the delayed status indicator less frequently than the events occur.

According to an embodiment, a method comprises: storing a resource status counter in a first memory; storing an intermediate counter in a second memory; updating the intermediate counter responsive to countable events; recurrently updating the resource status counter by adding the intermediate counter to the resource status counter, and resetting the intermediate counter, the updating of the resource status counter being performed less frequently than the updating of the intermediate counter.

In an embodiment, the method further comprises: storing a status indicator; recurrently updating the status indicator based on comparing the resource status counter to at least one threshold for the status indicator, the status indicator being updated responsive to the updating of the resource status counter; determining whether to perform one or more actions based on the status indicator.

According to an embodiment, a method comprises: storing resource status counters in one or more first memories, the resource status counters including a separate resource status counter for each object of a plurality of objects; storing intermediate counters in one or more second memories, the intermediate counters including a separate intermediate counter for each object of the plurality of objects; storing status indicators, the status indicators including at least one status indicator for each object of the plurality of objects; updating the intermediate counters responsive to countable events; recurrently updating the resource status counters for the objects by adding the intermediate counters for the objects to the corresponding resource status counters, and resetting the intermediate counters; recurrently updating the status indicators based on comparing the corresponding resource status counters to one or more corresponding thresholds for the status indicators.

In an embodiment, the method further comprises storing the status indicators in the one or more second memories.

In an embodiment, updating the resource status counters for the objects and updating the status indicators are both performed less frequently than the countable events occur.

In an embodiment, updating the status indicators comprises updating a given status indicator responsive to updating a given resource status counter that corresponds to a same object as the given status indicator.

In an embodiment, the method further comprises updating the resource status counters and updating the status indicators asynchronously relative to the countable events.

In an embodiment, the one or more second memories support higher access rates than the one or more first memories.

In an embodiment, the method further comprises, based on one or more particular status indicators of the status indicators, the one or more particular status indicators being for a particular object of the plurality of objects, determining one or more actions to take in response to a particular event associated with the particular object.

In an embodiment, determining the one or more actions to take involves determining whether to assign a resource for the particular object.

In an embodiment, determining the one or more actions to take involves determining whether to buffer or to drop a message that has been routed to or through the particular object.

In an embodiment, determining the one or more actions to take involves determining whether to mark a packet that has been routed to or through the particular object.

In an embodiment, determining the one or more actions to take involves determining whether to trigger flow control for a packet that has been routed to or through the particular object.

In an embodiment, updating the resource status counters comprises periodically selecting, from the plurality of objects, at least a particular object whose resource status counter is to be to updated, wherein over the course of a plurality of periods, each object of the plurality of objects is selected.

In an embodiment, periodically selecting, from the plurality of objects, at least a particular object comprises selecting objects in the plurality of objects in a predetermined order.

In an embodiment, periodically selecting, from the plurality of objects, at least a particular object further comprises selecting certain objects in the plurality of objects out of the predetermined order, based on one or more optimizing algorithms.

In an embodiment, periodically selecting, from the plurality of objects, at least a particular object comprises selecting objects in the plurality of objects based on magnitudes of their corresponding intermediate counters.

In an embodiment, periodically selecting, from the plurality of objects, at least a particular object comprises selecting a fixed number objects in each period of the plurality of periods.

In an embodiment, the one or more corresponding thresholds include a first threshold for a first object of the plurality of objects and a second threshold for a second object, the first threshold being different than the second threshold.

In an embodiment, the method further comprises storing the one or more corresponding thresholds in the one or more first memories.

In an embodiment, the status indicators include multiple state indicators for each object in the plurality of objects, the multiple state indicators corresponding to different types of states, the one or more corresponding thresholds including different thresholds for the different types of states.

In an embodiment, the countable events include resource assignments and resource unassignments.

In an embodiment, updating the intermediate counters comprises incrementing and decrementing intermediate counters by amounts greater than one.

In an embodiment, the countable events include arrivals and departures of messages.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 4:
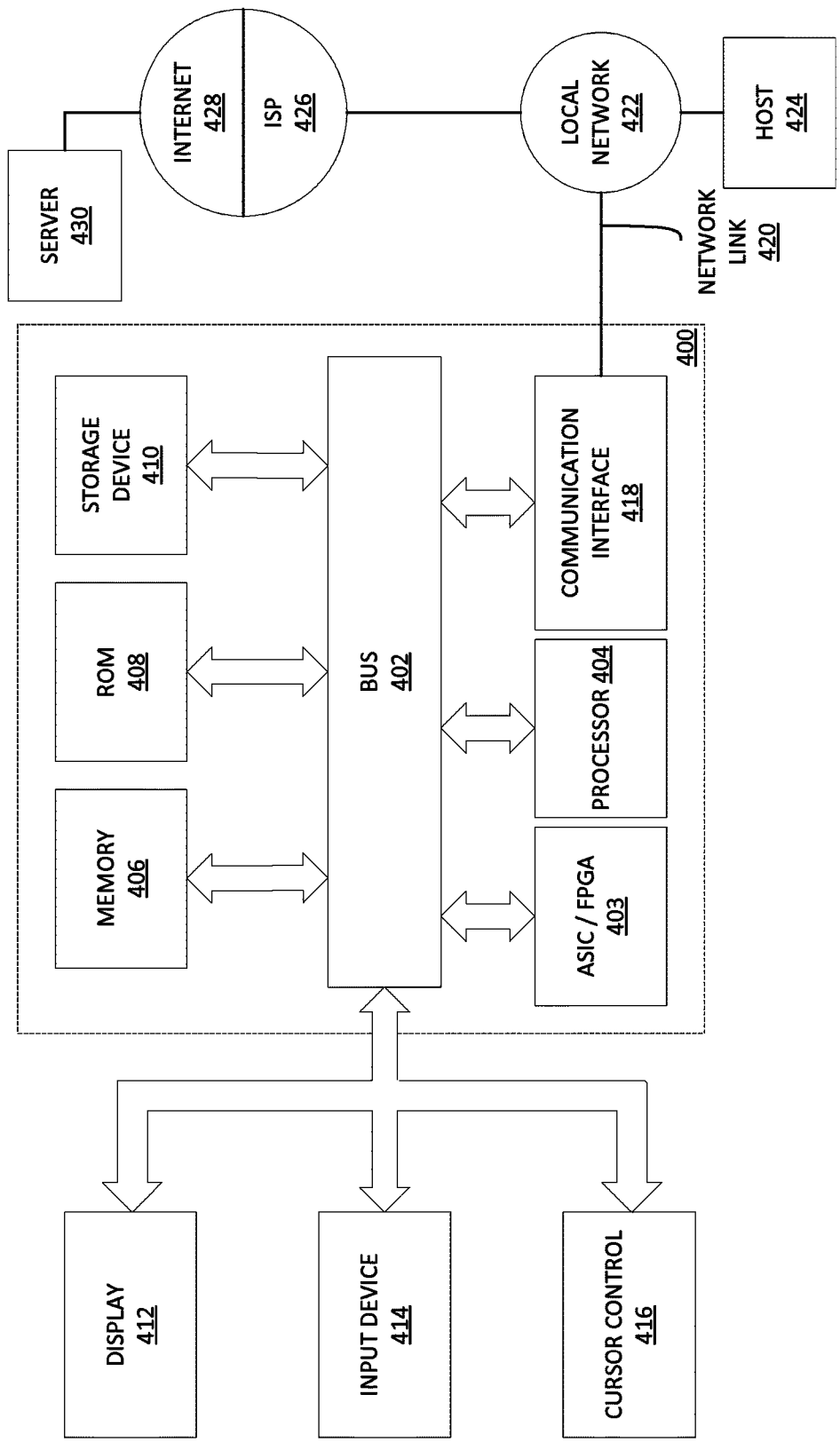
FIG. 4 is block diagram of a computer system upon which embodiments of the invention may be implemented.

FIG. 4 is a block diagram that illustrates a computer system 400 that may be utilized in implementing the above-described techniques, according to an embodiment. Computer system 400 may be, for example, a desktop computing device, laptop computing device, tablet, smartphone, server appliance, computing mainframe, multimedia device, handheld device, networking apparatus, or any other suitable device.

Computer system 400 may include one or more ASICs, FPGAs, or other specialized circuitry 403 for implementing program logic as described herein. Additionally, and/or instead, computer system 400 may include one or more hardware processors 404. Computer system 400 may also include one or more busses 402 or other communication mechanism for communicating information. Busses 402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 400 also includes one or more memories 406, such as a random access memory (RAM), registers, or other dynamic or volatile storage device for storing data units to be processed by the one or more ASICs, FPGAs, or other specialized circuitry 403. Memory 406 may also or instead be used for storing information and instructions to be executed by processor 404. Memory 406 may be directly connected or embedded within circuitry 403 or a processor 404. Or, memory 406 may be coupled to and accessed via bus 402. Memory 406 also may be used for storing temporary variables, data units describing rules or policies, or other intermediate information during execution of program logic or instructions.

Computer system 400 further includes one or more read only memories (ROM) 408 or other static storage devices coupled to bus 402 for storing static information and instructions for processor 404. One or more storage devices 410, such as a solid-state drive (SSD), magnetic disk, optical disk, or other suitable non-volatile storage device, may optionally be provided and coupled to bus 402 for storing information and instructions.

A computer system 400 may also include, in an embodiment, one or more communication interfaces 418 coupled to bus 402. A communication interface 418 provides a data communication coupling, typically two-way, to a network link 420 that is connected to a local network 422. For example, a communication interface 418 may be an integrated services digital network (ISDN) card, cable modem, satellite modem, or a modem to provide a data communication connection to a corresponding type of telephone line. As another example, the one or more communication interfaces 418 may include a local area network (LAN) card to provide a data communication connection to a compatible LAN. As yet another example, the one or more communication interfaces 418 may include a wireless network interface controller, such as a 802.11-based controller, Bluetooth controller, Long Term Evolution (LTE) modem, and/or other types of wireless interfaces. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by a Service Provider 426. Service Provider 426, which may for example be an Internet Service Provider (ISP), in turn provides data communication services through a wide area network, such as the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

In an embodiment, computer system 400 can send messages and receive data through the network(s), network link 420, and communication interface 418. In some embodiments, this data may be data units that the computer system 400 has been asked to process and, if necessary, redirect to other computer systems via a suitable network link 420. In other embodiments, this data may be instructions for implementing various processes related to the described techniques. For instance, in the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. As another example, information received via a network link 420 may be interpreted and/or processed by a software component of the computer system 400, such as a web browser, application, or server, which in turn issues instructions based thereon to a processor 404, possibly via an operating system and/or other intermediate layers of software components.

Computer system 400 may optionally be coupled via bus 402 to one or more displays 412 for presenting information to a computer user. For instance, computer system 400 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 412.

One or more input devices 414 are optionally coupled to bus 402 for communicating information and command selections to processor 404. One example of an input device 414 is a keyboard, including alphanumeric and other keys. Another type of user input device 414 is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Yet other examples of suitable input devices 414 include a touch-screen panel affixed to a display 412, cameras, microphones, accelerometers, motion detectors, and/or other sensors. In an embodiment, a network-based input device 414 may be utilized. In such an embodiment, user input and/or other information or commands may be relayed via routers and/or switches on a Local Area Network (LAN) or other suitable shared network, or via a peer-to-peer network, from the input device 414 to a network link 420 on the computer system 400.

As discussed, computer system 400 may implement techniques described herein using customized hard-wired logic, one or more ASICs or FPGAs 403, firmware and/or program logic, which in combination with the computer system causes or programs computer system 400 to be a special-purpose machine. According to one embodiment, however, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 400 can receive the data on the network and demodulate the signal to decode the transmitted instructions. Appropriate circuitry can then place the data on bus 402. Bus 402 carries the data to main memory 406, from which processor 404 retrieves and executes the instructions. The instructions received by main memory 406 may optionally be stored on storage device 410 either before or after execution by processor 404.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A networking apparatus comprising:
   communication hardware interfaces coupled to one or more networks, the communication hardware interfaces configured to receive and send messages;
   networking hardware configured to process routable messages received over the communication hardware interfaces;
   one or more first memories configured to store full status counters;
   one or more second memories configured to store intermediate counters, the one or more second memories being different than the one or more first memories, each of the intermediate counters corresponding to a different one of the full status counters;
   a counting subsystem configured to increment the intermediate counters responsive to the communication hardware interfaces receiving the routable messages and to decrement the intermediate counters responsive to at least one of: the communication hardware interfaces sending the routable messages, or the networking hardware disposing of the routable messages;
   a status update subsystem configured to update the full status counters by: adding the intermediate counters to the full status counters to which the intermediate counters respectively correspond, and resetting the intermediate counters;
   an update controller configured to identify times for the status update subsystem to update specific full status counters of the full status counters;
   a threshold application subsystem configured to compare thresholds to the full status counters, and to assign states to the full status counters based on the comparing;
   one or more third memories configured to store status indicators of the assigned states.

2. The apparatus of claim 1:
   wherein the one or more second memories are the one or more third memories.

3. The apparatus of claim 1, wherein the one or more first memories are single-ported memories, wherein the one or more second memories are multi-ported registers.

4. The apparatus of claim 1,
   wherein each of the full status counters corresponds to a different set of one or more status indicators;

wherein the status update subsystem is further configured to update the status indicators responsive to and based on updating the full status counters to which the status indicators respectively correspond;

wherein the networking hardware is configured to use the status indicators to determine how to process at least certain messages of the routable messages.

5. The apparatus of claim 1, wherein the update controller is configured to only update a limited number of the full status counters in a given set of one or more clock cycles, wherein the counting subsystem is not restricted to updating the limited number of the intermediate counters in the given set of one or more clock cycles.

6. The apparatus of claim 5, wherein the update controller selects which specific full status counters to update in which specific set of one or more clock cycles using logic configured both to select each of the full status counters at least once in a given period of time, and to select certain full status counters determined to be of high priority more frequently than other full status counters.

7. A method comprising:
   storing resource status counters in one or more first memories, the resource status counters including a separate resource status counter for each object of a plurality of objects;
   storing intermediate counters in one or more second memories, the intermediate counters including a separate intermediate counter for each object of the plurality of objects;
   storing status indicators, the status indicators including at least one status indicator for each object of the plurality of objects;
   updating the intermediate counters responsive to countable events;
   recurrently updating the resource status counters for the objects by adding the intermediate counters for the objects to the corresponding resource status counters, and resetting the intermediate counters;
   recurrently updating the status indicators based on comparing the corresponding resource status counters to one or more corresponding thresholds for the status indicators;
   receiving and processing messages received over communications hardware interfaces, the processing being at least partially based on states indicated by the status indicators.

8. The method of claim 7, further comprising storing the status indicators in the one or more second memories.

9. The method of claim 7, wherein updating the status indicators comprises updating a given status indicator responsive to updating a given resource status counter that corresponds to a same object as the given status indicator.

10. The method of claim 7, further comprising updating the resource status counters and updating the status indicators asynchronously relative to the countable events.

11. The method of claim 7, wherein the one or more second memories support higher access rates than the one or more first memories.

12. The method of claim 7, wherein processing the messages further comprises, based on one or more particular status indicators of the status indicators, the one or more particular status indicators being for a particular object of the plurality of objects, determining one or more actions to take in response to a particular event associated with the particular object.

13. The method of claim 12, wherein determining the one or more actions to take involves determining one or more of: whether to assign a resource for the particular object, whether to buffer or to drop a message that has been routed to or through the particular object, whether to mark a packet that has been routed to or through the particular object, or whether to trigger flow control for a packet that has been routed to or through the particular object.

14. The method of claim 7, wherein updating the resource status counters comprises:
   periodically selecting, from the plurality of objects, at least a particular object whose resource status counter is to be updated, wherein over the course of a plurality of periods, each object of the plurality of objects is selected;
   wherein periodically selecting, from the plurality of objects, at least a particular object comprises selecting first objects in the plurality of objects in a predetermined order, and selecting second objects in the plurality of objects out of the predetermined order, based on one or more optimizing algorithms;
   wherein periodically selecting, from the plurality of objects, at least a particular object comprises selecting objects in the plurality of objects based on magnitudes of their corresponding intermediate counters.

15. The method of claim 7, wherein the one or more corresponding thresholds include a first threshold for a first object of the plurality of objects and a second threshold for a second object, the first threshold being different than the second threshold, the method further comprising storing the one or more corresponding thresholds in the one or more first memories.

16. The method of claim 7, wherein the one or more corresponding thresholds include a first threshold for a first object of the plurality of objects and a second threshold for a second object, the first threshold being different than the second threshold, wherein the status indicators include multiple state indicators for each object in the plurality of objects, the multiple state indicators corresponding to different types of states, the one or more corresponding thresholds including different thresholds for the different types of states.

17. The method of claim 7, wherein the countable events include resource assignments and resource unassignments, or wherein the countable events include arrivals and departures of messages.

18. One or more non-transitory computer-readable media, storing instructions that, when executed by a computing device, cause performance of:
   storing resource status counters in one or more first memories, the resource status counters including a separate resource status counter for each object of a plurality of objects;
   storing intermediate counters in one or more second memories, the intermediate counters including a separate intermediate counter for each object of the plurality of objects;
   storing status indicators, the status indicators including at least one status indicator for each object of the plurality of objects;
   updating the intermediate counters responsive to countable events;
   recurrently updating the resource status counters for the objects by adding the intermediate counters for the objects to the corresponding resource status counters, and resetting the intermediate counters;

recurrently updating the status indicators based on comparing the corresponding resource status counters to one or more corresponding thresholds for the status indicators;

receiving and processing messages received over communications hardware interfaces, the processing being at least partially based on states indicated by the status indicators.

19. The one or more non-transitory computer-readable media of claim 18, wherein the instructions, when executed by the computing device, further cause storing the status indicators in the one or more second memories.

20. The one or more non-transitory computer-readable media of claim 18, wherein the instructions, when executed by the computing device, further cause updating the resource status counters and updating the status indicators asynchronously relative to the countable events.

* * * * *